United States Patent
Sumi et al.

(10) Patent No.: US 8,547,130 B2
(45) Date of Patent: Oct. 1, 2013

(54) METHOD AND DEVICE FOR DETECTING FOREIGN PARTICLE IN LIQUID CRYSTAL DISPLAY PANEL

(75) Inventors: Kazuyuki Sumi, Osaka (JP); Manabu Hashimoto, Osaka (JP); Masashi Inoue, Osaka (JP); Yoshihiro Nishimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 419 days.

(21) Appl. No.: 12/934,494

(22) PCT Filed: Feb. 26, 2009

(86) PCT No.: PCT/JP2009/053511
§ 371 (c)(1),
(2), (4) Date: Oct. 19, 2010

(87) PCT Pub. No.: WO2009/119239
PCT Pub. Date: Oct. 1, 2009

(65) Prior Publication Data
US 2011/0025363 A1 Feb. 3, 2011

(30) Foreign Application Priority Data

Mar. 26, 2008 (JP) .................................. 2008-079548
Aug. 25, 2008 (JP) .................................. 2008-214906

(51) Int. Cl.
*G01R 31/26* (2006.01)
(52) U.S. Cl.
USPC ..... 324/760.01; 345/50; 349/192; 356/239.8; 356/237.3; 324/760.02; 72/153; 72/173; 72/175
(58) Field of Classification Search
USPC ............. 345/50; 349/192; 356/239.8, 237.3; 324/760, 760.012, 760.02, 760.01; 72/173, 72/175, 153
See application file for complete search history.

(56) References Cited

U.S. PATENT DOCUMENTS 8,061,172 B2 * 11/2011 Gravier ........................... 72/173
2005/0018119 A1 * 1/2005 Takeda et al. ................. 349/130

FOREIGN PATENT DOCUMENTS

| JP | 63-293581 A | | 11/1988 |
| JP | 2002-62517 A | | 2/2002 |
| JP | 2002062517 A | * | 2/2002 |
| JP | 2007-316327 A | | 12/2007 |

* cited by examiner

Primary Examiner — Jermele M Hollington
Assistant Examiner — Sean Curtis
(74) *Attorney, Agent, or Firm* — Birch, Stewart, Kolasch & Birch, LLP

(57) ABSTRACT

A method for detecting a foreign particle trapped between substrates of a liquid crystal display panel, by which a potential short caused by the particle can be made into a short with reliability, and thus it is possible to make a display defect manifest itself that is caused by the particle. The method is for detecting the presence of a foreign particle trapped between flexible substrates (21, 26) of a liquid crystal display panel (20), between the substrates liquid crystals filled, and the method includes making the panel pass between supporting rollers (3) arranged to support one surface of the panel, and a pressing roller (4) disposed at a position opposed to a space between the supporting units and arranged to press the other surface of the panel, bending the panel, and displacing the substrates with respect to each other in their surface directions.

7 Claims, 8 Drawing Sheets

METHOD AND DEVICE FOR DETECTING FOREIGN PARTICLE IN LIQUID CRYSTAL DISPLAY PANEL

TECHNICAL FIELD

The present invention relates to a method and a device for detecting the presence of a conductive foreign particle that is trapped between substrates of a liquid crystal display panel.

BACKGROUND ART

A liquid crystal display panel is in widespread use in recent years as a display unit of a household electrical appliance such as a computer and a television set. The liquid crystal display panel has a configuration such that a thin film transistor (TFT) array substrate and a color filter (CF) substrate in pair are opposed parallel to each other leaving a given gap therebetween, and liquid crystals are filled between the substrates. A plurality of pixel electrodes arranged in a matrix are provided on the TFT array substrate, and a common electrode is provided almost all over the CF substrate, so that changing a voltage placed between the electrodes can control alignment of the liquid crystals.

This type of liquid crystal display panel is produced by preparing the TFT array substrate and the CF substrate separately, bonding the substrates together, and sealing in liquid crystals between the substrates. The produced liquid crystal display panel is usually subjected to a quality inspection such as a lighting inspection. In the lighting inspection, by irradiating the liquid crystal display panel with light from behind, and by applying a signal voltage for inspection to each of the pixel electrodes on the TFT array substrate and the common electrode on the CF substrate and turning on all of the pixels, an image for inspection is displayed visible on a display screen of the liquid crystal display panel and thus an operator visually inspects the image for the presence of a defective pixel.

In this case, if a conductive foreign particle is trapped between electrodes on the TFT array substrate that include source electrodes, gate electrodes and the pixel electrodes, and the common electrode on the CF substrate, and a short is caused between the electrodes on the substrates, a defective site where the short exists is displayed as a streaky or point-like display defect. In this lighting inspection, if the conductive foreign particle has a size larger than the gap between the electrodes on the TFT array substrate and the common electrode on the CF substrate, the defective site can be detected. However, if the conductive foreign particle has a size as large as the gap between the electrodes on the TFT array substrate and the common electrode on the CF substrate, the conductive foreign particle causes a potential short between the electrodes on the substrates, which does not always generate a display defect, and thus a site where the conductive foreign particle is trapped sometimes cannot be detected as a streaky or point-like display defect. In the liquid crystal display panel in which the potential short caused by the conductive foreign particle that cannot be detected in this lighting inspection exists between the electrodes on the substrates, there arises a problem that a display defect could be generated in the marketplace.

In order to solve this problem, a method is known such that the potential short caused by the conductive foreign particle between the electrodes on the substrates as described above is made into a short by pressing the surface of the liquid crystal display panel using a rubber roller jig 50 shown in FIG. 10, and thus a defective site where the short exists is made to manifest itself as a display defect (see Japanese Patent Application Laid-Open Publications No. SHO63-293581).

SUMMARY OF INVENTION

Technical Problem

FIG. 11 is a cross-sectional view of a liquid crystal display panel 20 in which a conductive foreign particle is trapped. As shown in FIG. 11, a TFT array substrate 21 includes a flexible glass substrate 22 on the top surface of which pixel electrodes 23 are arranged in a matrix. An insulating film 25 is provided on the pixel electrodes 23. A CF substrate 26 includes a flexible glass substrate 27 on the bottom surface of which a common electrode 28 is provided. Liquid crystals 24 are sealed in between the electrodes 23 and the electrode 28.

A plurality of gate electrodes 31 and a plurality of source electrodes 32 are arranged on the TFT array substrate 21 in an intersecting manner, and the pixel electrodes 23 are disposed individually in regions surrounded by the adjacent gate electrodes 31 and the adjacent source electrodes 32. Thin film transistors (TFTs) 33 are provided in the vicinities of the intersections of the gate electrodes 31 and the source electrodes 32. Gate signal voltages applied to the gate electrodes 31 turn on and off the TFTs 33, and source signal voltages sent from the source electrodes 32 are applied to the pixel electrodes 23 via semiconductor layers 34 and drain electrodes 35. Meanwhile, a black matrix 36 in a lattice pattern is provided on the CF substrate 26 so as to shield the gate electrodes 31 and the source electrodes 32, and color layers 37 of red, green, and blue are provided in lattice cell regions formed by the black matrix 36.

In FIG. 11, the insulating film 25 is provided on the pixel electrode 23 while a conductive foreign particle 38, which is trapped on the pixel electrode 23 for some reason, is left there, and thus the conductive foreign particle 38 is covered with the insulating film 25. In this case, the conductive foreign particle 38 has a size as large as a gap between the pixel electrodes 23 and the common electrode 28. Having such a size, while not causing a short, the conductive foreign particle 38 causes a potential short between the electrodes 23 and 28 as shown in FIG. 11, which could be made into a short if the insulating film 25 comes off for some reason and the tip of the conductive foreign particle 38 comes into contact with the common electrode 28.

Even if the surface of the liquid crystal display panel 20 is pressed using the rubber roller jig 50 described above and the gap between the electrodes 23 and 28 is lessened in order to make the potential short caused by the conductive foreign particle 38 between the electrodes 23 and 28 into a short, a display defect caused by a short between the electrodes 23 and 28 is not always generated because the tip of the conductive foreign particle 38 does not come into contact with the common electrode 28 because of the insulating film 25 covering the conductive foreign particle 38 as shown in FIG. 12. That is, the trapped conductive foreign particle 38 that causes the potential short between the electrodes 23 and 28 cannot be detected only by pressing the surface of the liquid crystal display panel 20 using the rubber roller jig 50.

An object of the invention is to overcome the problem described above and to provide a method and a device for detecting a foreign particle in a liquid crystal display panel, by which a potential short caused by the trapped conductive foreign particle can be made into a short with reliability, and thus it is possible to make a display defect manifest itself that is caused by the trapped conductive foreign particle.

Solution to Problem

In order to overcome the problem described above, one of preferred embodiments of the present invention provides a method for detecting presence of a conductive foreign particle that is trapped between a pair of flexible substrates of a liquid crystal display panel, between the substrates liquid crystals being filled, and making a display defect manifest itself that is caused by the trapped conductive foreign particle, the method including the steps of making the liquid crystal display panel pass between a pair of supporting units that are arranged to support one surface of the liquid crystal display panel and a pressing unit that is disposed at a position opposed to a space between the supporting units and arranged to press the other surface of the liquid crystal display panel, bending the liquid crystal display panel, and displacing the substrates with respect to each other in directions of their surfaces.

According to the method for detecting the foreign particle in the liquid crystal display panel described above, the liquid crystal display panel is made to pass between the pair of supporting units arranged to support the one surface of the liquid crystal display panel and the pressing unit disposed at the position opposed to the space between the supporting units and arranged to press the other surface of the liquid crystal display panel, and the liquid crystal display panel is bent by passing between the supporting units and the pressing unit, whereby the substrates are displaced with respect to each other in direct ions of their surfaces. Therefore, even when a potential short is caused by the conductive foreign particle 38 trapped between the electrodes 23 and 28 because the tip of the conductive foreign particle 38 is covered with the insulating film 25 as shown in FIG. 11, the insulating film 25 on the tip of the conductive foreign particle 38 can be peeled off by getting worn out as shown in FIG. 5, which can make the potential short into a short. Also in a case where a conductive foreign particle projects from the CF substrate, which is different from FIG. 5, the insulating film on the electrodes on the TFT array substrate can be peeled off, which can make a potential short between the electrodes on the TFT array substrate and the electrode on the CF substrate into a short.

Consequently, it is possible to make the display defect manifest itself that is caused by the conductive foreign particle trapped between the electrodes on the substrates, which cannot be achieved in a conventional manner of pressing a surface of the liquid crystal display panel using a rubber roller jig.

If rotatable supporting rollers that have the shape of a cylinder are used for the supporting units and a rotatable pressing roller that has the shape of a cylinder is used for the pressing unit, the passing of the liquid crystal display panel between the supporting rollers and the pressing roller is made easier, whereby the liquid crystal display panel is bent with ease, which makes it possible to displace the substrates with respect to each other in their surface directions.

If glass substrates are used for the substrates, and surfaces of the supporting rollers and/or a surface of the pressing roller is covered with a resin layer made of nylon, the glass substrates and the nylon-resin-layer covered surface are not easily charged with electricity, and the amount of the charged electricity is decreased. This is because nylon, the ordinal rank of which in the triboelectric series is close to glass, covers the surface of the supporting rollers and/or the pressing roller. It is to be noted that the triboelectric series is a list that ranks various materials in order of decreasing tendency to charge positively and increasing tendency to charge negatively when they are touched with or rubbed against another object. In using the glass substrates, the liquid crystal display panel can be prevented from being charged with electricity by covering the surfaces of the supporting rollers and/or the surface of the pressing roller that is touched with or rubbed against the glass substrates with the resin layer made of nylon, the ordinal rank of which in the triboelectric series is close to glass. Usually, if the liquid crystal display panel is charged with electricity, display unevenness shows up in the liquid crystal display panel, and obstructs a lighting inspection of the liquid crystal display panel; however, because no display unevenness shows up in this case, the lighting inspection can be prevented from being obstructed. It is preferable that both the surfaces of the supporting rollers and the surface of the pressing roller are covered with the nylon resin layer because the liquid crystal display panel can be further prevented from being charged with electricity.

If the nylon resin layer includes a cushion layer to which elasticity is imparted by providing a plurality of openings along a circumferential direction of the resin layer, the roller surface functions as a cushion layer. Thus, when a foreign particle lies on a surface of the liquid crystal display panel, the liquid crystal display panel can be prevented from being damaged by the foreign particle.

If the amount of the bend of the liquid crystal display panel is 0.5 mm to 2 mm, the liquid crystal display panel can be bent without being broken when the pair of flexible substrates are generally-used glass substrates each having a thickness of about 0.7 mm.

If the method further includes the step of subjecting the liquid crystal display panel made to pass between the supporting units and the pressing unit to a lighting inspection, a display defect in the liquid crystal display panel can be detected where the display defect caused by the conductive foreign particle manifests itself by bending the liquid crystal display panel.

In order to overcome the problem described above, another preferred embodiment of the present invention provides a device for detecting presence of a conductive foreign particle that is trapped between a pair of flexible substrates of a liquid crystal display panel, between the substrates liquid crystals being filled, and making a display defect manifest itself that is caused by the trapped conductive foreign particle, the device including a pair of supporting units that are arranged to support one surface of the liquid crystal display panel, and a pressing unit that is disposed at a position opposed to a space between the supporting units and arranged to press the other surface of the liquid crystal display panel, the device being arranged to make the liquid crystal display panel pass between the supporting units and the pressing unit, bend the liquid crystal display panel, and displace the substrates with respect to each other in directions of their surfaces.

According to the device for detecting the foreign particle in the liquid crystal display panel described above, the device includes the pair of supporting units that are arranged to support the one surface of the liquid crystal display panel, and the pressing unit that is disposed at the position opposed to the space between the supporting units and arranged to press the other surface of the liquid crystal display panel, and the device is arranged to make the liquid crystal display panel pass between the supporting units and the pressing unit, bend the liquid crystal display panel, and displace the substrates with respect to each other in their surface directions. Therefore, as shown in FIG. 11, even when a potential short is caused by the conductive foreign particle 38 trapped between the electrodes 23 and 28 because the tip of the conductive foreign particle 38 is covered with the insulating film 25, the insulating film 25 on the tip of the conductive foreign particle 38 can be peeled off by getting worn out as shown in FIG. 5, which can make the potential short into a short. Consequently, it is possible to make the display defect manifest itself that is caused by the conductive foreign particle trapped between the electrodes on the substrates, which cannot be achieved in a conventional manner of pressing a surface of the liquid crystal display panel using a rubber roller jig.

If rotatable supporting rollers that have the shape of a cylinder are used for the supporting units and a rotatable pressing roller that has the shape of a cylinder is used for the pressing unit, the passing of the liquid crystal display panel between the supporting rollers and the pressing roller is made easier, whereby the liquid crystal display panel is bent with ease, which makes it possible to displace the substrates with respect to each other in their surface directions.

If the device further includes a unit arranged to impart a rotary motion to the supporting rollers, the liquid crystal display panel can be conveyed while passing between the supporting rollers and the pressing roller, whereby the liquid crystal display panel is bent with ease, which makes it possible to displace the substrates with respect to each other in their surface directions. In addition, a burden put upon an operator and working hours of the operator can be reduced compared with a case of pressing a surface of the liquid crystal display panel using a rubber roller jig.

If glass substrates are used for the substrates, and surfaces of the supporting rollers and/or a surface the pressing roller is covered with a resin layer made of nylon, the glass substrates and the nylon-resin-layer covered surface are not easily charged with electricity, and the amount of the charged electricity is decreased. This is because nylon, the ordinal rank of which in the triboelectric series is close to glass, covers the surfaces of the supporting rollers and/or the surface of the pressing roller. The liquid crystal display panel can be thus prevented from being charged with electricity, so that display unevenness does not show up in the liquid crystal display panel. It is preferable that both the surfaces of the supporting rollers and the surface of the pressing roller are covered with the nylon resin layer because the liquid crystal display panel can be further prevented from being charged with electricity.

If the nylon resin layer includes a cushion layer to which elasticity is imparted by providing a plurality of openings along a circumferential direction of the resin layer, the roller surface functions as a cushion layer. Thus, when a foreign particle lies on a surface of the liquid crystal display panel, the liquid crystal display panel can be prevented from being damaged by the foreign particle.

If the amount of the bend of the liquid crystal display panel is 0.5 mm to 2 mm, the liquid crystal display panel can be bent without being broken when the pair of flexible substrates are generally-used glass substrates each having a thickness of about 0.7 mm.

If the device further includes a unit arranged to perform a lighting inspection on the liquid crystal display panel made to pass between the supporting units and the pressing unit, a display defect in the liquid crystal display panel can be detected where the display defect caused by the conductive foreign particle manifests itself by bending the liquid crystal display panel.

Advantageous Effects of Invention

According to the method and the device for detecting the foreign particle in the liquid crystal display panel, the display defect caused by the conductive foreign particle trapped between the substrates manifests itself by bending the liquid crystal display panel and displacing the substrates with respect to each other in their surface directions. Thus, it is possible to make the display defect manifest itself that is caused by the conductive foreign particle trapped between the electrodes on the substrates, which cannot be achieved in a conventional manner of pressing a surface of the liquid crystal display panel using a rubber roller jig.

DESCRIPTION OF EMBODIMENTS

Figure 1:
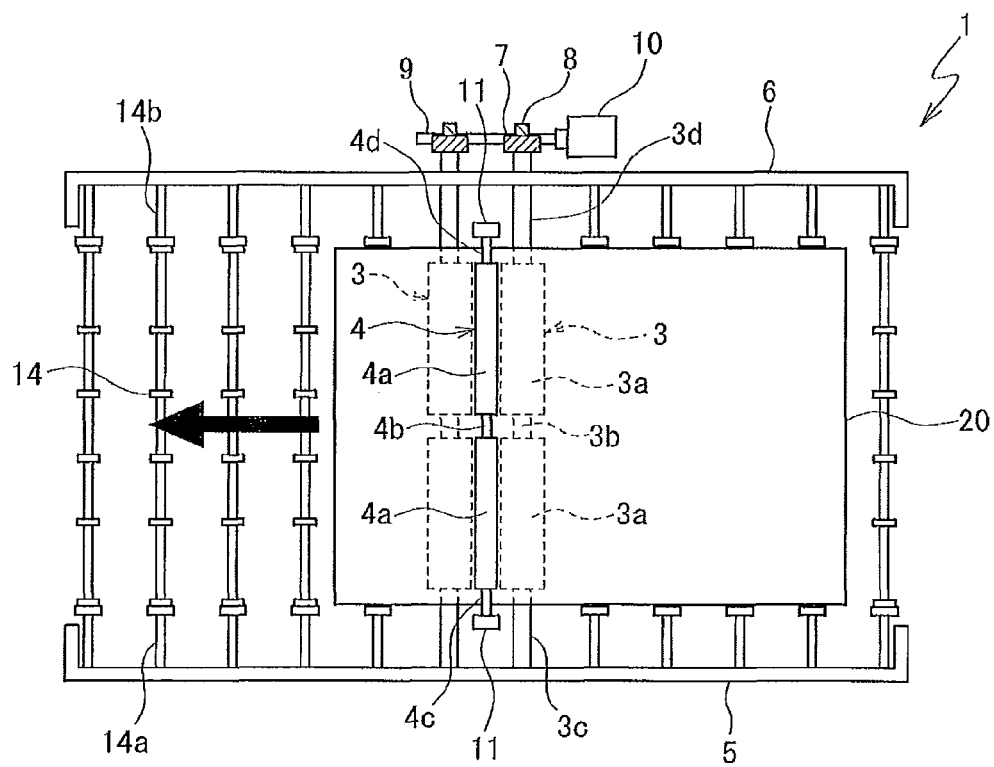
FIG. 1 is a top view showing a schematic configuration of a device for detecting a foreign particle in a liquid crystal display panel according to one preferred embodiment of the present invention.
Figure 2:
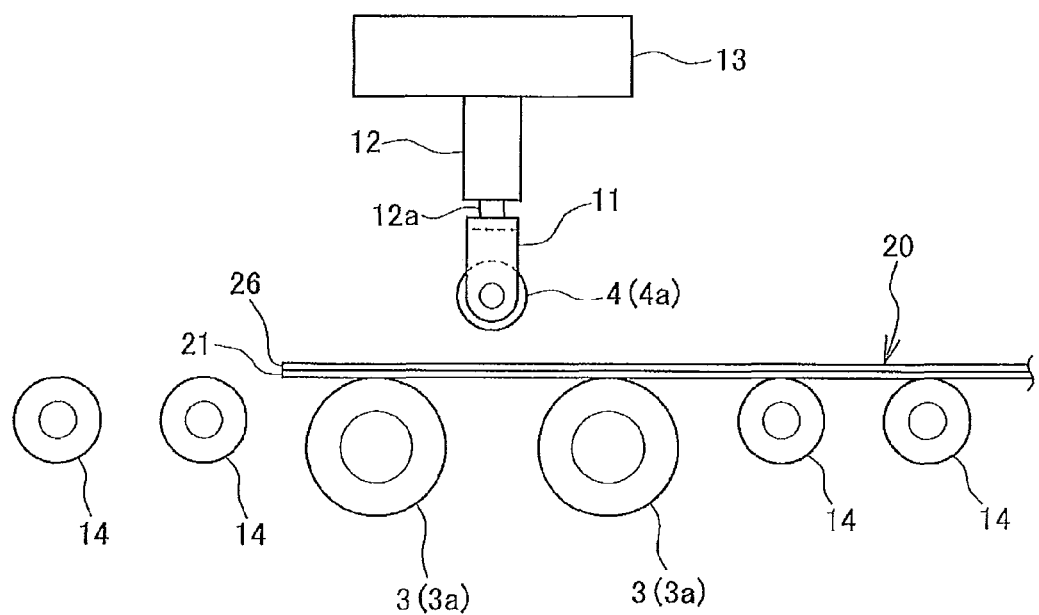
FIG. 2 is a side view showing a step of a process of bending the liquid crystal display panel by supporting rollers and a pressing roller of the foreign-particle detecting device.
Figure 3:
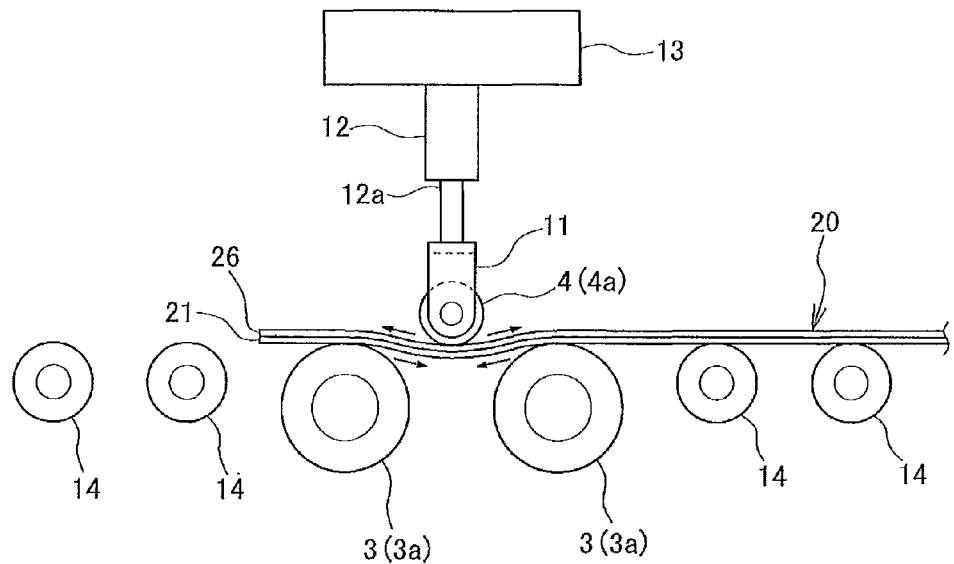
FIG. 3 is a side view showing a subsequent step of the process of bending the liquid crystal display panel by the supporting rollers and the pressing roller of the foreign-particle detecting device.
Figure 4:
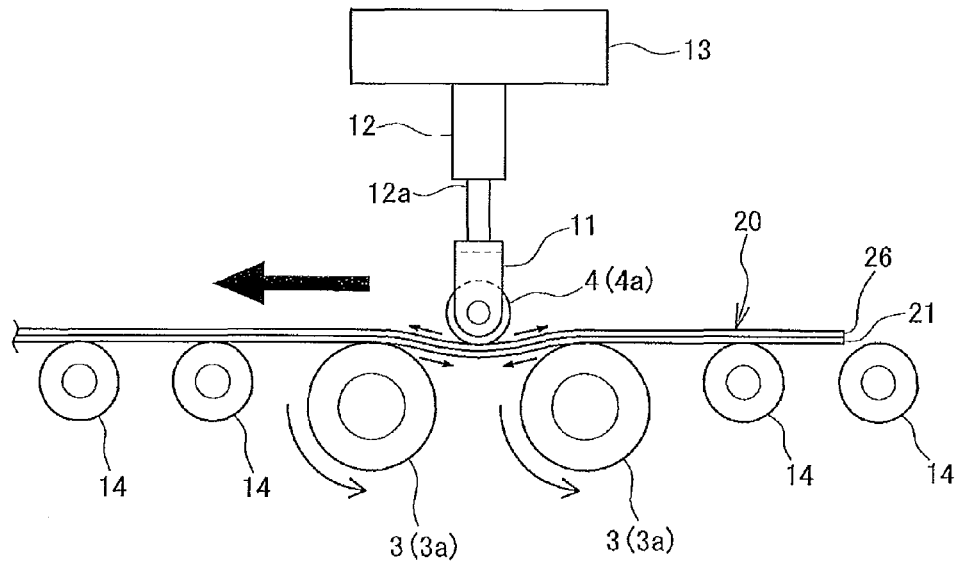
FIG. 4 is a side view showing a subsequent step of the process of bending the liquid crystal display panel by the supporting rollers and the pressing roller of the foreign-particle detecting device.
Figure 5:
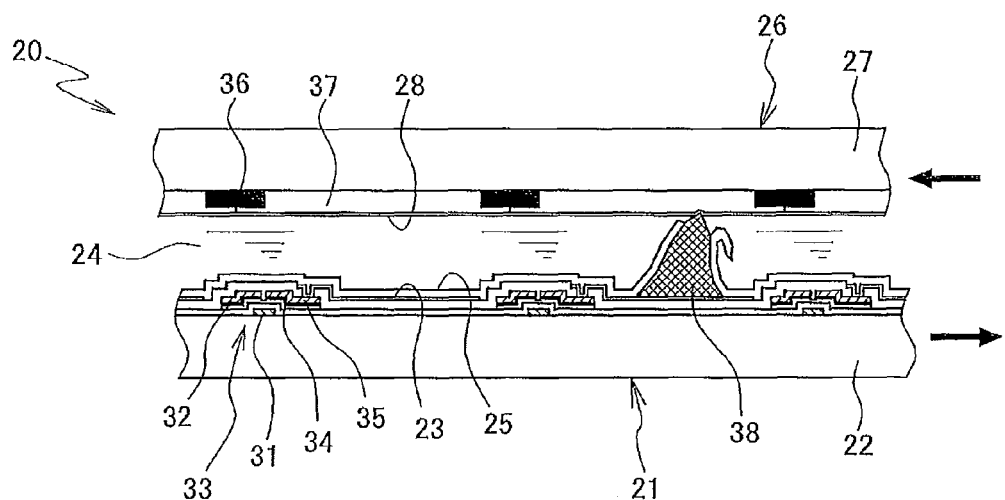
FIG. 5 is a cross-sectional view of the liquid crystal display panel in which substrates are displaced with respect to each other when the liquid crystal display panel is bent.
Figure 11:
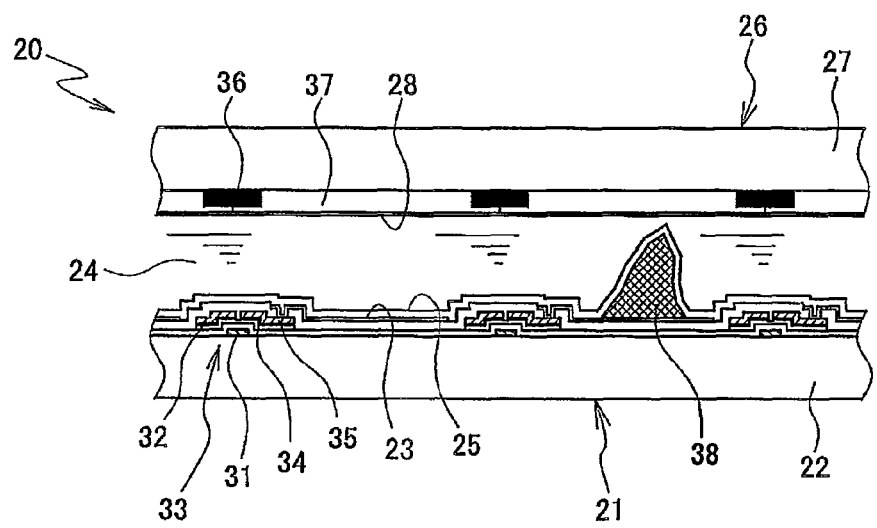
FIG. 11 is a cross-sectional view of the liquid crystal display panel in which a conductive foreign particle is trapped between the substrates.
Figure 12:
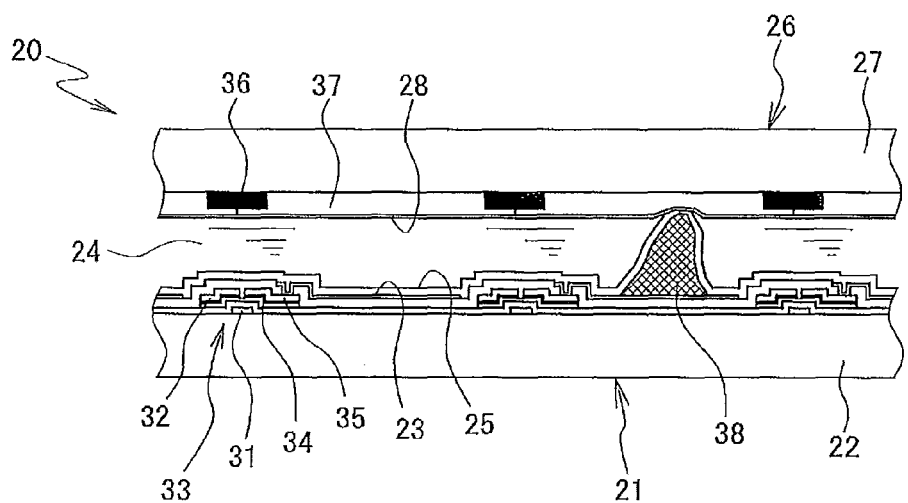
FIG. 12 is a cross-sectional view of the liquid crystal display panel shown in FIG. 11 where the liquid crystal display panel is pressed by the rubber roller jig shown in FIG. 10.

Detailed descriptions of a method and a device for detecting a foreign particle in a liquid crystal display panel according to preferred embodiments of the present invention will now be provided with reference to the accompanying drawings. FIG. 1 is a top view showing a schematic configuration of the device for detecting the foreign particle in the liquid crystal display panel according to one of the preferred embodiments of the present invention. FIGS. 2 to 4 are side views showing steps of a process of bending the liquid crystal display panel while the liquid crystal display panel is conveyed. FIG. 5 is a cross-sectional view of the liquid crystal display panel in which a conductive foreign particle is trapped between substrates, and the substrates are displaced with respect to each other. It is to be noted that explanations of structural components same as those of the liquid crystal display panel 20 shown in FIGS. 11 and 12 are omitted while reference numerals same as those of the liquid crystal display panel 20 are provided thereto.

As shown in FIG. 1, a device 1 for detecting a foreign particle includes two supporting rollers 3 arranged to horizontally support the undersurface of the liquid crystal display panel 20, one pressing roller 4 disposed at a position opposed to a substantial midsection between the supporting rollers 3 and arranged to press the top surface of the liquid crystal display panel 20, and device frames 5 and 6 in the middle of which the supporting rollers 3 and the pressing roller 4 are disposed.

The supporting rollers 3 each have a configuration such that two rubber rollers 3a each having the shape of a cylinder and made from nitrile rubber are connected via a connecting member 3b at the middle section. In this preferred embodiment of the present invention, the rubber rollers 3a have a diameter of about 60 mm, and a rubber hardness of about Hs 70. The distance between the supporting rollers 3 is about 100 mm.

Spindles 3c and 3d project from both ends of the supporting rollers 3. The spindles 3c on one-side ends of the supporting rollers 3 are supported rotatably by the device frame 5 that is disposed at the side shown in the lower section of FIG. 1. The spindles 3d on the other-side ends of the supporting rollers 3 are supported rotatably by the device frame 6 that is disposed at the side shown in the upper section of FIG. 1. Gears 7 are attached to the tips of the spindles 3d, and gears 8 that mesh with the gears 7 are attached to a shaft 9. The shaft 9 is rotated by driving of a motor 10, and the supporting rollers 3 are rotated by the driving of the motor 10. Thus, the liquid crystal display panel 20 placed on the supporting rollers 3 can be conveyed in the direction from the right side to the left side of FIG. 1, for example.

The pressing roller 4 has a configuration such that two rubber rollers 4a each having the shape of a cylinder and made from nitrile rubber are connected via a connecting member 4b at the middle section. In this preferred embodiment of the present invention, the rubber rollers 4a have a diameter of about 30 mm, and a rubber hardness of about Hs 70. Spindles 4c and 4d project from both ends of the pressing roller 4. The spindles 4c and 4d are supported rotatably by supporting brackets 11. As shown in FIG. 2, the supporting brackets 11 are fixed to the tips of extendable cylinder rods 12a of air cylinders 12. The air cylinders 12 are fixed to a device frame 13 that is disposed above such that the cylinder rods 12a extend and contract in a direction vertical to the top surface of the liquid crystal display panel 20. Thus, the pressing roller 4 is movable up and down relatively to the liquid crystal display panel 20 supported on the supporting rollers 3 by driving of the air cylinders 12.

A plurality of conveying rollers 14 that are arranged to horizontally support the undersurface of the liquid crystal display panel 20 are disposed in front of and behind the supporting rollers 3 and the pressing roller 4. Spindles 14a and 14b project from both ends of the conveying rollers 14. The spindles 14a and 14b are supported rotatably by the device frames 5 and 6, respectively.

Next, a description of the steps of the operation of the foreign-particle detecting device 1 described above is provided with reference to FIGS. 2 to 4. First, as shown in FIG. 2, the liquid crystal display panel 20 is placed on the conveying rollers 14 disposed to the right side of the supporting rollers 3, and conveyed such that the left end of the liquid crystal display panel 20 is placed on the two supporting rollers 3. During this time, the pressing roller 4 is left apart above the supporting rollers 3, and is not yet pressing the top surface of the liquid crystal display panel 20.

Then, as shown in FIG. 3, the pressing roller 4 is brought down from the above by the driving of the air cylinders 12, and the top surface of the liquid crystal display panel 20 is pressed at the midsection of the region supported by the supporting rollers 3. During this time, the pressing roller 4 is brought down by the air cylinders 12 to the position where the difference between the lowest horizontal surface of the pressing roller 4 and the highest horizontal surface of the supporting rollers 3 becomes about 1 mm. Thus, the liquid crystal display panel 20 at the region supported by the supporting rollers 3 is bent so as to be displaced downward by about 1 mm by the supporting rollers 3 and the pressing roller 4 as shown in FIG. 3.

Then, as shown in FIG. 4, when the supporting rollers 3 are rotated by the driving of the motor 10, the entire surface of the liquid crystal display panel 20 is made to pass between the supporting rollers 3 and the pressing roller 4 while being bent.

A case is explained where, as shown in FIG. 11, a conductive foreign particle 38 is trapped between the substrates 21 and 26 of the liquid crystal display panel 20 that is made to pass between the supporting rollers 3 and the pressing roller 4 while being bent as described above.

As shown in FIGS. 3 and 4, bending stress is applied to the liquid crystal display panel 20 by bending the liquid crystal display panel 20 with the use of the supporting rollers 3 and the pressing roller 4. Thus, the substrates 21 and 26 are displaced with respect to each other in their surface directions due to the difference between the curvature radius of the lower substrate (TFT array substrate) 21 and the curvature radius of the upper substrate (CF substrate) 26. To be specific, in the liquid crystal display panel 20 between the right supporting roller 3 and the pressing roller 4, the lower substrate 21 is displaced to the left while the upper substrate 26 is displaced to the right due to the difference between the curvature radius of the lower substrate 21 and the curvature radius of the upper substrate 26, as shown in FIGS. 3 and 4.

Meanwhile, in the liquid crystal display panel 20 between the left supporting roller 3 and the pressing roller 4, the lower substrate 21 is displaced to the right while the upper substrate 26 is displaced to the left due to the difference between the curvature radius of the lower substrate 21 and the curvature radius of the upper substrate 26, as shown in FIGS. 3 and 4.

FIG. 5 is the cross-sectional view of the liquid crystal display panel 20 in which the substrates 21 and 26 are displaced with respect to each other in their surface directions when the liquid crystal display panel 20 is made to pass between the left supporting roller 3 and the pressing roller 4 as described above. The lower substrate (TFT array substrate) 21 is displaced to the right while the upper substrate (CF substrate) 26 is displaced to the left as shown in FIG. 5. By the displacement of the substrates 21 and 26 in their surface directions, even when a potential short is caused by the conductive foreign particle 38 trapped between the electrodes 23 and 28 because the tip of the conductive foreign particle 38 is covered with the insulating film 25 as shown in FIG. 11, the insulating film 25 on the tip of the conductive foreign particle 38 can be peeled off by getting worn out as shown in FIG. 5. Thus, by bringing the conductive foreign particle 38, on the tip of which the insulating film 25 is peeled off, into contact with the common electrode 28, the potential short caused by the conductive foreign particle 38 trapped between the electrodes 23 and 28 is made into a short.

As described above, because the foreign-particle detecting device 1 has the configuration of making the liquid crystal display panel 20 pass between the supporting rollers 3 and the pressing roller 4, bending the liquid crystal display panel 20 to apply bending stress thereto, and displacing the substrates with respect to each other in their surface directions, it is possible to make a display defect manifest itself that is caused by the conductive foreign particle 38 trapped between the substrates 21 and 26 even when the tip of the conductive foreign particle 38 trapped between the electrodes 23 and 28 is covered with the insulating film 25 and the liquid crystal display panel 20 has a potential short existing between the electrodes 23 and 28.

Figure 6:
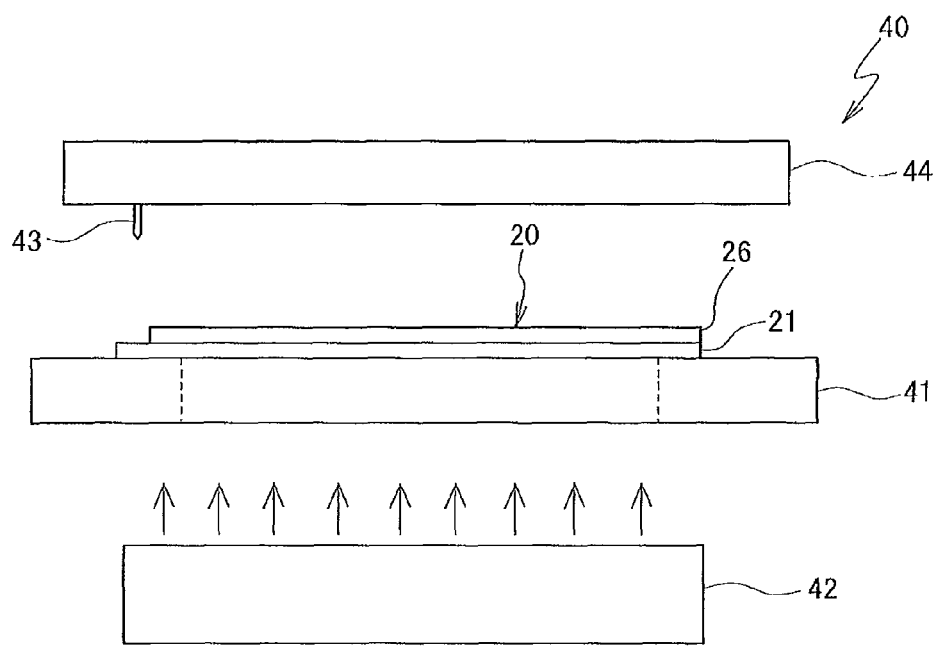
FIG. 6 is a side view of a unit arranged to perform a lighting inspection on the liquid crystal display panel made to pass through the foreign-particle detecting device.

Next, a description of a unit arranged to perform a lighting inspection on the liquid crystal display panel 20 after subjected to the treatment by the foreign-particle detecting device 1 is provided. As shown in FIG. 6, a unit 40 arranged to perform a lighting inspection includes a stage 41, a backlight unit 42, and a frame 44 that includes a signal input pin 43. The unit 40 has a rectangular opening so that an image display region of the liquid crystal display panel 20 is exposed, and on the stage 41, the liquid crystal display panel 20 is placed. The backlight unit 42 is arranged to project light from below toward the liquid crystal display panel 20 placed on the stage 41. The signal input pin 43 is arranged to input an inspection signal into a signal input unit that is provided at the end of the liquid crystal display panel 20 placed on the stage 41.

A description of a process of the lighting inspection performed by the lighting inspection unit 40 is provided. First, the liquid crystal display panel 20 in which the display defect caused by the conductive foreign particle 38 manifests itself because the liquid crystal display panel 20 is bent by the foreign-particle detecting device 1 as described above is placed on the stage 41. Then, the frame 44 is brought down, and the signal input pin 43 thereof is brought into contact with the signal input unit of the liquid crystal display panel 20. Thus, a circuit arranged to generate the inspection signal (not shown) and the signal input unit of the liquid crystal display panel 20 are electrically connected via the signal input pin 43.

Then, the backlight unit 42 is turned on, and the inspection signal is inputted into the signal input unit of the liquid crystal display panel 20, whereby all of the pixels in the image display region of the liquid crystal display panel 20 are made visible. An inspection image that is displayed visible on the liquid crystal display panel 20 is visually observed by an operator. If the inspection image contains a streaky display defect or a point-like display defect that is caused by the conductive foreign particle 38 as described above, the liquid crystal display panel 20 is regarded as a defective product.

In the lighting inspection of the liquid crystal display panel 20 as described above, in the case of the liquid crystal display panel 20 that is bent by the foreign-particle detecting device 1 as shown in FIG. 5, the display defect caused by the trapped conductive foreign particle 38 can be found, which cannot be achieved in the case of the liquid crystal display panel 20 that is pressed using the rubber roller jig 50 as shown in FIG. 12. In the lighting inspection, the liquid crystal display panel 20 is thus regarded as a defective product without fault because the potential short caused by the conductive foreign particle 38 between the electrodes 23 and 28 can be made into a short and it is consequently possible to make the display defect manifest itself with the use of the foreign-particle detecting device 1. Thus, a liquid crystal display panel that has a potential short can be prevented from being distributed in the marketplace.

As described above, the foreign-particle detecting device 1 according to the preferred embodiment of the present invention that includes the two supporting rollers 3 arranged to support the one surface of the liquid crystal display panel 20, and the pressing roller 4 disposed at the position opposed to the substantial midsection between the supporting rollers 3 and arranged to press the other surface of the liquid crystal display panel 20 is capable of bending the liquid crystal display panel 20 and displacing the substrates 21 and 26 with respect to each other in their surface directions when making the liquid crystal display panel 20 pass between the supporting rollers 3 and the pressing roller 4.

By the displacement, even when a potential short is caused by the conductive foreign particle 38 trapped between the pixel electrodes 23 on the TFT array substrate 21 and the common electrode 28 on the CF substrate 26 because the tip of the conductive foreign particle 38 is covered with the insulating film 25 as shown in FIG. 11, the insulating film 25 on the tip of the conductive foreign particle 38 can be peeled off by getting worn out as shown in FIG. 5. Consequently, the potential short caused by the conductive foreign particle 38 trapped between the electrodes 23 and 28 is made into a short.

Figure 10:
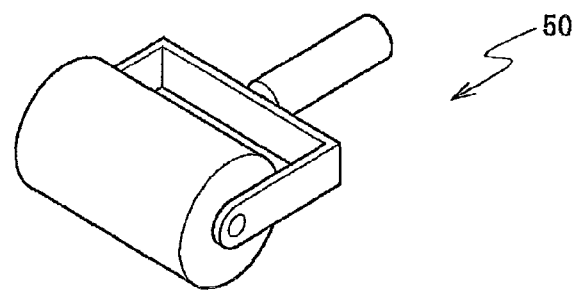
FIG. 10 is an external perspective view showing a conventionally-used rubber roller jig for pressing a surface of a liquid crystal display panel.

Thus, it is possible to make the display defect manifest itself that is caused by the conductive foreign particle 38 trapped between the substrates 21 and 26, which cannot be achieved in a conventional manner of pressing the surface of the liquid crystal display panel 20 using the rubber roller jig 50 shown in FIG. 10.

In this case, the motor 10 imparts the rotary motion to the supporting rollers 3 as described above, and the liquid crystal display panel 20 can be conveyed while passing between the supporting rollers 3 and the pressing roller 4, whereby the liquid crystal display panel 20 is bent with ease, which makes it possible to displace the substrates 21 and 26 with respect to each other in their surface directions. Consequently, a burden put upon an operator and working hours of the operator can be reduced compared with the case of pressing the entire surface of the liquid crystal display panel 20 using the rubber roller jig 50.

In addition, because the liquid crystal display panel 20 at the region supported by the supporting rollers 3 is bent so as to be displaced downward by about 1 mm by the supporting rollers 3 and the pressing roller 4 as shown in FIGS. 3 and 4 as described above, the liquid crystal display panel 20 can be bent without being broken when the pair of substrates 21 and 26 each include a generally-used flexible glass substrate having a thickness of about 0.7 mm.

Figure 7:
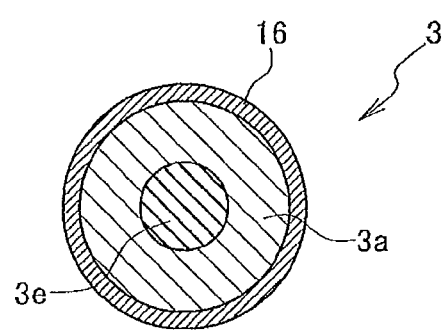
FIG. 7 is a cross-sectional view showing a first modified embodiment of the supporting roller.

Next, a description of a first modified embodiment of the supporting rollers 3 of the foreign-particle detecting device 1 described above is provided referring to a cross-sectional view of FIG. 7. As shown in FIG. 7, each supporting roller 3 includes a metal shaft 3e, a rubber roller 3a that has the shaft 3e as its central axis, a resin layer 16 that is made of nylon and has the shape of a cylinder having a given thickness so as to cover the surface of the rubber roller 3a. Each supporting roller 3 has the configuration of being covered with the nylon resin layer 16 on its surface, the ordinal rank of nylon in the triboelectric series being close to the glass substrate 22, in order that the glass substrate 22 and the nylon-resin-layer covered surface may not be easily charged with electricity, and the amount of the charged electricity may be decreased.

Figure 8:
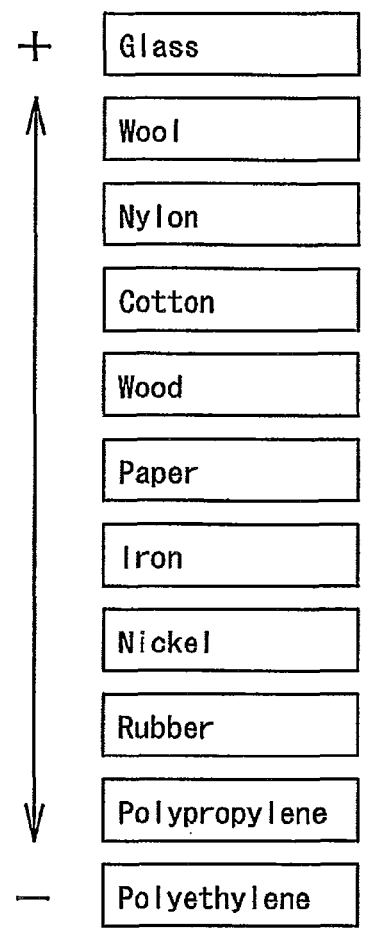
FIG. 8 is a list of the triboelectric series that ranks various materials in order of decreasing tendency to charge positively and increasing tendency to charge negatively when they are touched with or rubbed against another object.

It is to be noted that the triboelectric series is a list that ranks various materials in order of decreasing tendency to charge positively and increasing tendency to charge negatively when they are touched with or rubbed against another object as shown in FIG. 8. That is, the triboelectric series is a list that ranks various materials according to their tendency to gain or lose electrons.

The triboelectric series usually lists materials in order of decreasing tendency to charge positively, and increasing tendency to charge negatively as shown in FIG. 8. To be specific, if an arbitrary material A and an arbitrary material B selected from the triboelectric series, where the material A is ranked to be more positive than the material B, rub against each other, the material A charges positively and the material B charges negatively. Therefore, as is well known, when materials that are ranked close come into contact with and rub against each other, the amount of the charged electricity is relatively small, while when materials that are ranked far come into contact with and rub against each other, the amount of the charged electricity is large.

If the glass substrate 22 of the liquid crystal display panel 20 that is made of glass comes into contact with the supporting rollers 3 made from the rubber material that is ranked far from glass in the triboelectric series, the glass substrate 22 charges positively and the amount of the charged electricity could be large. Usually, if the liquid crystal display panel 20 is charged with electricity, the charged electricity could show up as display unevenness (electrostatic unevenness) in the liquid crystal display panel 20. As a result, the lighting inspection of the liquid crystal display panel 20 is obstructed because of the display unevenness.

In order that the liquid crystal display panel 20 may not be charged with electricity, the surfaces of the supporting rollers 3 of the foreign-particle detecting device 1 that come into contact with and rub against the liquid crystal display panel 20 are evenly covered with the nylon resin layers 16, the ordinal rank of nylon in the triboelectric series being close to glass as shown in FIG. 8.

Among the components of the liquid crystal display panel 20, the TFT array substrate 21 that comes into contact with the supporting rollers 3 while passing through the foreign-particle detecting device 1 is easily charged with electricity because a variety of electrodes including the pixel electrodes 23 and the gate electrodes 31 are provided on the TFT array substrate 21. However, because the surfaces of the supporting rollers 3 are covered with the nylon resin layers 16, the liquid crystal display panel 20 can be prevented from being charged with electricity.

Besides, it is preferable that the surfaces of both the supporting rollers 3 and the pressing roller 4 are covered with the nylon resin layers 16 because covering the surface of the pressing roller 4 with the nylon resin layer 16 (not shown) similarly to the supporting rollers 3 can further prevent the liquid crystal display panel 20 from being charged with electricity.

Figure 9A:
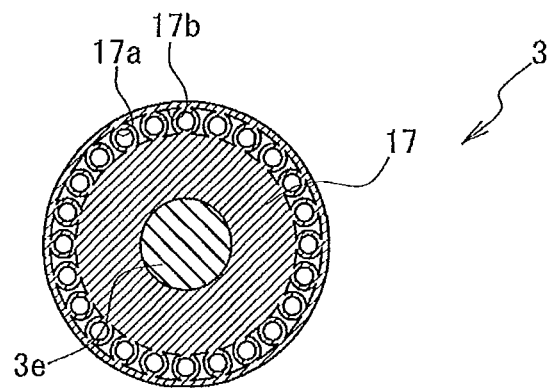
FIGS. 9A, 9B and 9C are cross-sectional views showing a second modified embodiment of the supporting roller.

Next, a description of a second modified embodiment of the supporting rollers 3 is provided referring to FIG. 9A. As shown in FIG. 9A, each supporting roller 3 includes the metal shaft 3e, and a resin layer 17 that is made of nylon and has the shape of a cylinder having a thickness larger than the nylon resin layer 16 shown in FIG. 7 so as to cover the shaft 3e.

The nylon resin layer 17 includes a plurality of openings 17a each having the shape of a circle in cross section, and a plurality of openings 17b each having the shape of an hourglass in cross section. The openings 17a and the openings 17b are disposed at a given depth position from the surface of the resin layer 17, and arranged alternately along a circumferential direction of the resin layer 17. The portion where the openings 17a and the openings 17b are provided functions as a cushion layer to which elasticity is imparted.

Because cushioning properties are imparted to the surfaces of the nylon resin layers 17, when a foreign particle lies on a surface of the liquid crystal display panel 20 with which the supporting rollers 3 come into contact, and the supporting rollers 3 roll on the foreign particle, the surfaces of the supporting rollers 3 are recessed inward along the shape of the foreign particle, which reduces stress locally applied to the liquid crystal display panel 20 by the foreign particle. Consequently, the liquid crystal display panel 20 can be prevented from being damaged by the foreign particle when passing between the rollers 3 and 4 of the foreign-particle detecting device 1.

Figure 9B:
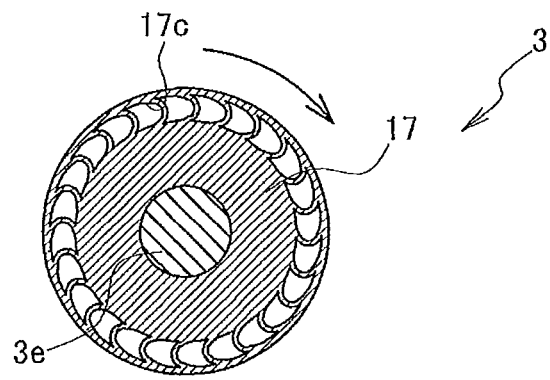
Figure 9C:
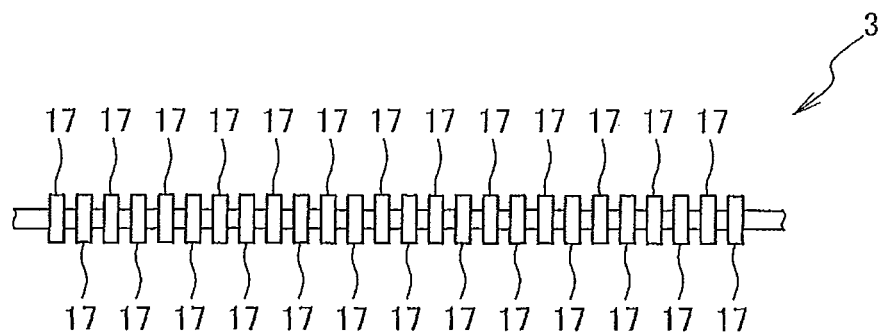

Another configuration of imparting cushioning properties to the surface of the nylon resin layer 17 is shown in FIG. 9B. In this configuration, the nylon resin layer 17 includes a plurality of openings 17c each having the substantial shape of the letter D in cross section. In this case, by rotating the supporting rollers 3 in the direction toward the right of the D-shaped openings 17c, the direction indicated by the arrow in FIG. 9B, the surfaces of the supporting rollers 3 are easily recessed inward when the supporting rollers 3 roll on the foreign particle. Consequently, the portion where the openings 17c are provided functions as a cushion layer in an efficient manner.

It is preferable that the pressing roller 4 is also covered with the resin layer 17 made of nylon that includes the openings 17a and 17b (17c) similarly to the supporting rollers 3 (not shown). This is because if the pressing roller 4 is covered with the nylon resin layer 17, the liquid crystal display panel 20 can be further prevented from being charged with electricity. In addition, when a foreign particle lies on the surface of the liquid crystal display panel 20 with which the pressing roller 4 comes into contact, and the pressing roller 4 rolls on the foreign particle, the surface of the pressing roller 4 is recessed inward along the shape of the foreign particle, which reduces stress locally applied to the liquid crystal display panel 20 by the foreign particle. Thus, it is preferable that the surfaces of both the supporting rollers 3 and the pressing roller 4 are covered with the nylon resin layers 17 including the openings 17a and 17b (17c).

It is also preferable that the supporting rollers 3 including the nylon resin layers 17 are divided into smaller in a longitudinal direction than the supporting rollers 3 shown in FIG. 1 because the nylon resin layers 17 including the openings 17a and 17b (17c) can be easily formed.

The foregoing descriptions of the preferred embodiments of the present invention have been presented for purposes of illustration and description with reference to the drawings. However, it is not intended to limit the present invention to the preferred embodiments, and modifications and variations are possible as long as they do not deviate from the principles of the present invention. For example, the present invention is not limited to the above-described configuration of the supporting rollers 3 each including the two rubber rollers 3a linearly connected, nor the pressing roller 4 including the two rubber rollers 4a linearly connected. It is also preferable that each of the supporting rollers 3 and the pressing roller 4 includes one roller without a connecting member, or three or more rollers connected with connecting members. In addition, the present invention is not limited to the above-described numbers of the supporting rollers 3 and the pressing roller 4, which are two and one in the preferred embodiment of the present invention. It is also preferable that the numbers of the supporting rollers 3 and the pressing roller 4 are larger than the above-described numbers.

In addition, concerning the cross-sectional shapes of the openings 17a and 17b (17c) provided inside the nylon resin layers 17, the present invention is not limited to the above-described shapes of the circle, the hour-glass, or the letter D. It is also preferable that the openings 17a and 17b (17c) have a variety of other cross-sectional shapes in order to impart cushioning properties to the surfaces of the nylon resin layers 17.

The invention claimed is:

1. A method for detecting presence of a conductive foreign particle that is trapped between a pair of flexible substrates of a liquid crystal display panel, between the substrates liquid crystals being filled, and making a display defect manifest itself that is caused by the trapped conductive foreign particle, the method comprising the steps of:
   making the liquid crystal display panel pass between a pair of supporting units that are arranged to support one surface of the liquid crystal display panel, and a pressing unit that is disposed at a position opposed to a space between the supporting units, and arranged to press the other surface of the liquid crystal display panel;
   bending the liquid crystal display panel; and
   displacing the substrates with respect to each other in directions of their surfaces
   wherein an amount of the bend of the liquid crystal display panel is 0.5 mm to 2 mm.

2. A method for detecting presence of a conductive foreign particle that is trapped between a pair of flexible substrates of a liquid crystal display panel, between the substrates liquid crystals being filled, and making a display defect manifest itself that is caused by the trapped conductive foreign particle, the method comprising the steps of:
   making the liquid crystal display panel pass between a pair of supporting units that are arranged to support one surface of the liquid crystal display panel, and a pressing unit that is disposed at a position opposed to a space between the supporting units, and arranged to press the other surface of the liquid crystal display panel;
   bending the liquid crystal display panel; and
   displacing the substrates with respect to each other in directions of their surfaces,
   wherein the supporting units comprise rotatable supporting rollers that have the shape of a cylinder, and the pressing unit comprises a rotatable pressing roller that has the shape of a cylinder,
   wherein the substrates comprise glass substrates, and at least one of surfaces of the supporting rollers and a surface of the pressing roller is covered with a resin layer made of nylon, wherein the nylon resin layer comprises a cushion layer to which elasticity is imparted by providing a plurality of openings along a circumferential direction of the resin layer.

3. The method according to claim 1, further comprising the step of subjecting the liquid crystal display panel made to pass between the supporting units and the pressing unit to a lighting inspection.

4. A device for detecting presence of a conductive foreign particle that is trapped between a pair of flexible substrates of a liquid crystal display panel, between the substrates liquid crystals being filled, and making a display defect manifest itself that is caused by the trapped conductive foreign particle, the device comprising:
   a pair of supporting units that are arranged to support one surface of the liquid crystal display panel; and
   a pressing unit that is disposed at a position opposed to a space between the supporting units, and arranged to press the other surface of the liquid crystal display panel, the device being arranged to make the liquid crystal display panel pass between the supporting units and the pressing unit, bend the liquid crystal display panel, and displace the substrates with respect to each other in directions of their surfaces,
   wherein an amount of the bend of the liquid crystal display panel is 0.5 mm to 2 mm.

5. A device for detecting presence of a conductive foreign particle that is trapped between a pair of flexible substrates of a liquid crystal display panel, between the substrates liquid crystals being filled, and making a display defect manifest itself that is caused by the trapped conductive foreign particle, the device comprising:
   a pair of supporting units that are arranged to support one surface of the liquid crystal display panel; and
   a pressing unit that is disposed at a position opposed to a space between the supporting units, and arranged to press the other surface of the liquid crystal display panel, the device being arranged to make the liquid crystal display panel pass between the supporting units and the pressing unit, bend the liquid crystal display panel, and displace the substrates with respect to each other in directions of their surfaces,
   wherein the supporting units comprise rotatable supporting rollers that have the shape of a cylinder, and the pressing unit comprises a rotatable pressing roller that have the shape of a cylinder,
   wherein the substrates comprise glass substrates, and at least one of surfaces of the supporting rollers and a surface of the pressing roller is covered with a resin layer made of nylon,
   wherein the nylon resin layer comprises a cushion layer to which elasticity is imparted by providing a plurality of openings along a circumferential direction of the resin layer.

6. The device according to claim 5, further comprising a unit arranged to impart a rotary motion to the supporting rollers.

7. The device according to claim 4, further comprising a unit arranged to perform a lighting inspection on the liquid crystal display panel made to pass between the supporting units and the pressing unit.

* * * * *